United States Patent

Lock et al.

[15] 3,673,676
[45] July 4, 1972

[54] METHOD FOR FORMING TOOL ASSEMBLY

[72] Inventors: Everett H. Lock, Houston; Joe K. Heilhecker, Bellaire, both of Tex.

[73] Assignee: Esso Production Research Company

[22] Filed: May 13, 1970

[21] Appl. No.: 36,834

[52] U.S. Cl. .................................. 29/473.1, 287/189.365
[51] Int. Cl. .............................................. B23k 31/02
[58] Field of Search .............. 29/472.7, 473.1, 489, 473.5, 29/472.9; 287/189.365

[56] References Cited

UNITED STATES PATENTS

| 2,060,959 | 11/1936 | Terry | 29/489 |
| 2,150,379 | 3/1939 | Kerschbaum | 29/473.1 X |
| 2,163,408 | 6/1939 | Pulfrich | 29/473.1 X |
| 2,282,106 | 5/1942 | Underwood | 29/473.1 X |
| 2,728,425 | 12/1955 | Day | 29/473.1 X |
| 3,063,144 | 11/1962 | Palmour | 29/473.1 |
| 3,131,779 | 5/1964 | Rowley et al. | 239/602 X |
| 3,386,159 | 6/1968 | Mitch et al. | 29/473.1 |
| 2,619,432 | 11/1952 | Hosmer | 287/189.365 |

Primary Examiner—John F. Campbell
Assistant Examiner—Ronald J. Shore
Attorney—James A. Reilly, John B. Davidson, Lewis H. Eatherton, James E. Gilchrist, Robert L. Graham and James E. Reed

[57] ABSTRACT

A member composed of a hard, refractory ceramic is mechanically bonded to a ferroalloy support. The assembly is fabricated by placing the hard refractory ceramic member concentrically in an opening formed in the support; packing the space separating the two parts with a refractory hard metal powder; and at an elevated temperature, infiltrating the packed interval with a filler metal which wets the ferroalloy support and the refractory hard metal particles but not the refractory ceramic member. Upon cooling, the support and solidified filler metal contract about the ceramic member, holding it in place by compressive forces exerted thereon. The method can be used to fabricate a variety of tool assemblies for use in applications requiring hard, wear-resistant, high-temperature strength parts.

6 Claims, 2 Drawing Figures

PATENTED JUL 4 1972

3,673,676

INVENTORS
EVERETT H. LOCK
JOE K. HEILHECKER
BY R L Graham
ATTORNEY

METHOD FOR FORMING TOOL ASSEMBLY

BACKGROUND OF THE INVENTION

1. Field of the Invention

This invention relates to the joining of hard, refractory ceramics to ferroalloy supports.

2. Description of the Prior Art

The special characteristics of the hard, refractory ceramics give rise to a wide range of applications which require hard, high-temperature strength, and wear-resistant parts. Although there is a great deal of confusion and controversy surrounding the definition of ceramics, the term "refractory ceramics" or "ceramics" as used herein includes refractory compounds of the carbides, borides, nitrides, and oxides. This is in accordance with the definition in Kirk-Othmer *Encyclopedia of Chemical Technology*, Second Edition, Volume 4, page 774. The refractory ceramics can be classified according to their metal character: the compounds of the IVA–VIA periodic groups comprise the metallic ceramics, the most important of which are the cemented carbides of the refractory metals; the compounds of the IIIB–IVB periodic groups comprise the nonmetallic ceramics typified by the diamond-like carbides. The metallic or nonmetallic character significantly affects the manner in which the hard, refractory ceramic can be joined to steel or other ferroalloy supports.

Some uses of the hard, refractory ceramics are found in material finishing, sandblasting, and earth drilling operations. More specifically, hard ceramic tools are used to machine tough materials ranging from fiber glass to ferritic steel; hard carbide nozzles in sandblasting and earth drilling operations conduct highly abrasive fluids under extreme pressure conditions; and carbide inserts provide tough wear-resistant surfaces for earth drilling bits. In all of these applications, the ceramic members — blade, nozzle or insert — generally are formed in relatively small sizes which must be attached to a metal support for use. The metallic ceramics can be joined to metal supports by known brazing processes. Brazing is a welding technique for joining dissimilar metals and relies on the ability of a filler metal to wet both the ceramic and the metal base. When the filler metal solidifies, the parts are joined by a strong chemical bond, provided, of course, good wettability has been obtained. However, the ceramics are inherently difficult to wet by most filler metals. Moreover, the ceramic surface must be thoroughly cleaned. For hard ceramics, this usually requires grinding with a diamond wheel which adds to the cost of the operation. Thus in order to achieve a strong bond by brazing, extreme care must be exercised in the selection of the proper filler metal and in preparing the surface of the ceramic.

The nonmetallic ceramics are even more difficult to join to metal supports by conventional brazing techniques. Because of their nonmetallic character, these ceramics are generally considered to be unwettable by conventional filler metals. Consequently, the hard, nonmetallic ceramics are usually mounted on the metal support by mechanical bonding techniques which utilize organic adhesives, clamping devices, or interference fits. The bond strength afforded by the first two of these techniques restrict the application of the hard, nonmetallic ceramics to relatively light service. They are entirely unsuited for mounting nozzles on earth drilling bits where the nozzles are subjected to differential pressures in the range of 10,000 to 15,000 psi. The organic adhesives and clamping devices are not capable of providing sufficient bond strength under these severe operating conditions. The interference fit requires finishing of the mating parts to a dimensional tolerance less than 0.005 inch. The high cost of finishing the hard ceramic articles to meet this close dimensional tolerance makes the interference fit technique uneconomical for most applications.

Another commonly used technique for joining hard, refractory ceramics and metal parts involves coating the ceramic with a film containing an active metal such as titanium or zirconium. The coating or film renders the ceramic part wettable by filler metals and permits the fabrication of the parts by conventional brazing processes. Unlike the present invention, these premetalizing techniques rely upon chemical bonding to effect the union of parts.

SUMMARY OF THE INVENTION

The purpose of the present invention is to provide a method for mechanically bonding hard, refractory ceramic members such as tool elements to steel or other ferroalloy supports. The method finds particular advantageous application in fabricating (1) nozzle assemblies which can be used in sandblasting and earth drilling operations, and (2) cutting tools which can be used in lathes or other apparatus designed to process hard and tough materials.

Briefly the mounting procedure comprises locating a shaped, hard, refractory ceramic member concentrically in a suitable opening formed in a steel support; placing refractory hard metal powder of different composition than the ceramic in the opening in contact with the ceramic member and the steel support; infiltrating the refractory hard metal powder with a filler metal which wets the refractory hard metal and the steel support but not the ceramic member at an elevated temperature; and permitting the assembly to cool. As the assembly cools, the filler metal solidifies, bonding the refractory hard metal powder and the steel support into an integrated metallic sheath which surrounds the refractory ceramic member. Further cooling causes the metallic sheath to contract about the refractory ceramic member. Since the coefficient of thermal expansion for the metallic sheath is greater than that of the refractory ceramic, the ceramic member is maintained in a residual state of compression at low temperature ranges. Laboratory tests show that the bonding strength afforded by this method is extremely high.

The hard, refractory ceramics capable of being mounted to steel supports by this method include the hard metallic as well as the hard nonmetallic refractory ceramics. In mounting the hard metallic ceramics by this invention wettability between the ceramic and filler metal is not required as it is in the prior art methods. The important hard metallic ceramics include tungsten carbide, titanium carbide, tantalum carbide, niobium carbide, titanium nitride, and titanium boride.

A more important application, however, is perhaps found in connection with mounting the hard nonmetallic ceramics to metal supports. These materials comprise a class which have become known in the art as the "hard nonmetallic materials" and possess excellent properties of hardness, wear resistance, and high temperature strength. The hard nonmetallic ceramics include boron carbide ($B_4C$), silicon carbide (SiC), beryllium carbide ($Be_2C$), sintered alumina ($Al_2O_3$), boron nitride, cubic (BN), aluminum nitride (AlN), silicon nitride ($Si_3N_4$), and silicon boride ($SiB_6$). Kirk-Othmer, *Encyclopedia of Chemical Technology*, Second Edition, Volume 4, page 74, presents the physical properties of the hard nonmetallic materials.

The type of hard, refractory ceramic used in a particular application will depend upon several factors including loading conditions, temperature, and type of service. In nozzle service, the diamond-like carbides (boron carbide and silicon carbide) are preferred because of their hardness and excellent wear-resistant properties. In the cutting tool application, the cutting blades can be composed of any of the hard, refractory ceramics, with the diamond-like carbides and sintered alumina being preferred. From the foregoing it is apparent that the diamond-like carbides and sintered alumina are of the greatest interest; it should be understood, however, that the properties of the other hard, refractory ceramics suggest a wide range of applications including those discussed above.

The hard, refractory ceramics can be shaped to the desired configuration by conventional hot pressing techniques which transform powdered nonmetallic material into a dense, self-bonded member usually in simple form such as a solid cylinder, hollow cylinder, disc, block, etc. A particularly advantageous feature of the present invention is that the hard, refractory ceramic member can be mounted on the metal support as is, requiring no additional finishing.

The filler metal can be any of the conventional brazing alloys capable of wetting the ferroalloy support and the refractory hard metal powder and having a liquidus below the melting point of the materials to be assembled. The particles can include any of the metallic refractories which are not metallurgically affected by the brazing temperature range (from about 1,270°F to about 2,500°F). The refractory hard metals include the refractory metals (tungsten, columbium, molybdenum, tantalum) and the heavy metal carbides, or mixtures thereof. The particle size should be small enough to provide capillary distribution of the molten filler metal during the infiltration phase of the process. The mounting process of the present invention is most conveniently performed using furnace brazing equipment.

In summary, the present invention provides for an improved method for mounting hard, refractory ceramic members to ferroalloy supports, and an improved tool assembly for use in nozzle service, material-cutting service, or similar service which requires hard, high-temperature strength, and wear-resistant parts.

The present invention will be described in connection with preferred embodiments with emphasis being placed upon the hard nonmetallic ceramics. It should be understood, however, that the invention is equally applicable for mounting any of the hard, refractory ceramics where surface conditions are such that the filler metal does not wet the ceramic member.

DESCRIPTION OF THE PREFERRED EMBODIMENTS

Figure 1:
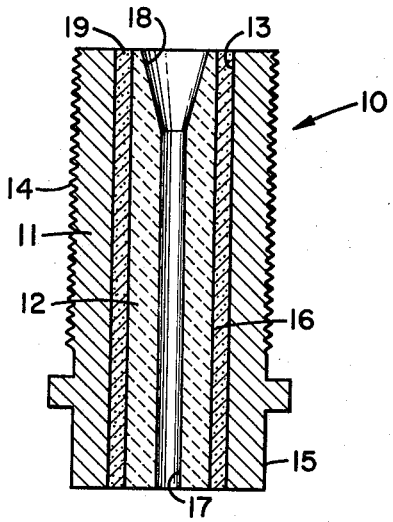
FIG. 1 is a longitudinal, sectional view of an improved nozzle assembly constructed according to the present invention.
Figure 2:
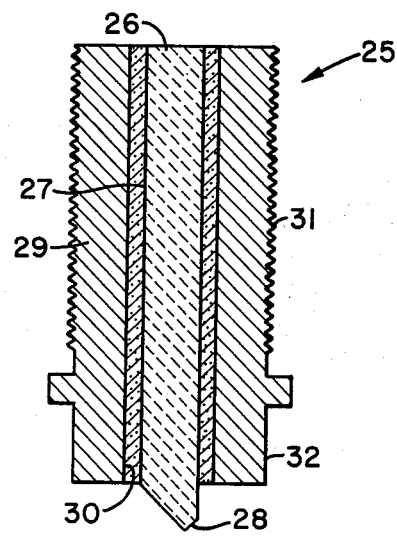
FIG. 2 is a longitudinal, sectional view of an improved cutting tool assembly constructed according to the present invention.

The mounting method of the present invention will be described with reference to two specific applications, e.g. nozzle assembly (FIG. 1) and a material-cutting tool (FIG. 2). It should be understood, however, that the method can be used to mount hard, refractory ceramic members on ferroalloy supports in a variety of other applications.

Referring to FIG. 1, a nozzle assembly 10 is seen to include a support sleeve 11 composed of steel or other ferroalloy, and a hollow, hard refractory ceramic nozzle 12. The sleeve can be milled from a steel block to provide an internal cylindrical surface 13, an external threaded portion 14, and a hex head 15. The threaded portion 14 and hex head 15 permit attachment of the nozzle assembly 10 to the main tool body such as an earth-drilling bit or a sandblasting gun. Alternatively, the sleeve 11 can be provided with a welding flange, or the nozzle 12 can be mounted directly to the main tool body.

The ceramic nozzle 12 can be prepared by conventional hot pressing techniques which produce a dense, self-bonded member. In accordance with these techniques, the ceramic members are produced within a tolerance range of about 1 percent of a given dimension. The nozzle 12 can be in a variety of geometric shapes but preferably is in the form of a hollow cylinder. In this embodiment the nozzle 12 has a cylindrical outer surface 16 and an inner flow passage 17 provided with a tapered inlet 18. The composition and properties of some of the more important hard, refractory ceramics usable as nozzles are listed in Table I. The ceramic materials can include small amounts of impurities or materials added to enhance physical or mechanical properties of the finished member.

TABLE I
Hard Refractory Ceramics

| | Hardness | Coefficient of Thermal Expansion |
|---|---|---|
| Metallic ceramics: | | |
| cemented carbides: | | |
| Tungsten carbide (WC) | 950–1800 ($H_v$)* | 4.5–7.5 × 10$^{-6}$/°C* |
| Tungsten carbide (WC) with major amounts of titanium and tantalum carbides | 1300–1700 ($H_v$)* | 5.5–7.5 × 10$^{-6}$/°C |
| Titanium carbide (TiC) | 3200 ($H_m$) | 7.4 × 10$^{-6}$/°C |
| Tantalum carbide (TaC) | 1790 ($H_m$) | 6.3 × 10$^{-6}$/°C |
| Niobium carbide (NbC) | 2400 ($H_m$) | 6.6 × 10$^{-6}$/°C |
| Titanium nitride (TiN) | 2450 ($H_m$) | 9.4 × 10$^{-6}$/°C |
| Titanium boride (TiB$_2$) | 3480 ($H_m$) | 6.4 × 10$^{-6}$/°C |
| Nonmetallic ceramics: | | |
| Boron carbide (B$_4$C) | 3700 ($H_m$) | 6.0 × 10$^{-6}$/°C |
| Silicon carbide (SiC) | 3500 ($H_m$) | 5.7 × 10$^{-6}$/°C |
| Beryllium carbide (Be$_2$C) | 2690 ($H_m$) | 7.4 × 10$^{-6}$/°C |
| Sintered alumina (Al$_2$O$_3$) | 2800 ($H_m$) | 7.8 × 10$^{-6}$/°C |
| Boron nitride, cubic (BN) | 3700 ($H_m$) | 2.0 × 10$^{-6}$/°C |
| Aluminum nitride (AlN) | 99 ($R_a$) | |
| Silicon nitride (Si$_3$N$_4$) | 99 ($R_a$) | 2.4 × 10$^{-6}$/°C |
| Silicon boride (SiB$_6$) | 2400 ($H_v$) | 6.3 × 10$^{-6}$/°C |

$H_m$ – microhardness.
$H_v$ – Vickers hardness.
$R_a$ – Rockwell hardness (Scale A).
*Property range covers the common grades with Co, Fe, or Ni binders.

In accordance with one aspect of this invention, the hard, refractory ceramic nozzle 12 can be mounted in the steel sleeve 11 wherein the bond is provided by a mechanical connection. The mounting process can be performed using conventional furnace brazing equipment. The outer periphery 16 of the nozzle 12 and the internal surface 13 of the sleeve 11 generally will be complementary shaped and circular in cross section so as to effect uniform distribution of forces. The sleeve 11 and nozzle 12 are placed in a refractory mold with the nozzle 12 being disposed concentrically in the sleeve 11 and with the complementary shaped portions arranged in confronting relation. The annular space 19 between the assembled parts should be large enough to permit the introduction of finely divided refractory material. A clearance greater than about 0.010 inches is sufficient with clearances of at least one-sixteenth inch being preferred.

Powdered refractory hard metal having a particle size between about 100 and 400 mesh on the Tyler screen scale is packed in the annular space 19. The interstitial flow passages in the packed interval provides for distribution of molten filler metal by capillary attraction. A powdered refractory metal (tungsten, molybdenum, columbium, tantalum, and their alloys) as well as a powdered heavy metal carbide (one of the carbides of the IVA–VIA periodic groups) can be used. The metal carbides are preferred, particularly tungsten carbide which possesses excellent mechanical properties and is readily wet by most filler metals.

The mold can be vibrated to settle the powdered refractory material and an excess can be placed above the annular space 19 in order to provide for the increase in annular space 19 resulting from the difference in thermal expansion of the metal sleeve 11 and the ceramic nozzle 12.

A solid filler metal can be preplaced in flow tubes provided in the mold and which discharge into the annular space 19. Suitable filler metals include the conventional brazing alloys capable of wetting the metallic refractory hard metal particles and the steel sleeve 11 and having a liquidus below the melting points of the steel, refractory and ceramic materials. These include copper alloys, copper-zinc alloys, silver alloys, copper-nickel alloys, copper-nickel-tin alloys, copper-nickel-iron alloys, copper-cobalt-tin alloys, copper-nickel-manganese alloys, iron-nickel-carbon alloys, copper-nickel-iron-tin alloys, and the like. Such alloys may contain minor quantities of other metals including zinc, tin, boron, beryllium, cadmium, silicon, manganese, and cobalt. From the foregoing it is apparent that there are a number of commercially available brazing alloys capable of wetting the ferroalloy and the refractory hard metal. Depending upon the type of ferroalloy, the type of refractory hard metal, and the contemplated tool service, some of the filler metals are preferred over others. In a preferred embodiment of the nozzle assembly comprising a sleeve of AISI 3310 steel, tungsten carbide particles, and a nonmetallic ceramic, the copper-nickel alloys are preferred. It should be observed that essentially all of the conventional filler metals are incapable of wetting the nonmetallic ceramics and many are incapable of wetting some of the metallic ceramics.

With the parts 11 and 12 assembled and the materials properly positioned, the mold is placed in a furnace and the temperature increased to the brazing temperature of the materials used (from about 1,270°F to about 2,500°F depending upon the composition of the filler metal). In some applications it may be necessary to select a filler metal having a high liquidus as experience has shown that best infiltration is achieved at the higher temperature range (from about 1,550°F to about 2,500°F). The filler metals can include materials to improve their wettability properties. At the elevated temperature, the filler metal melts and by gravity flow and capillary attraction infiltrates the packed annulus 19. The molten filler metal substantially fills the pore space providing a continuous matrix in the annulus 19 and wets the individual refractory hard metal particles as well as the inner surface 13 of the steel sleeve 11.

At the elevated temperature, the metal sleeve 11 has expanded radially outwardly substantially more than radial expansion of the ceramic nozzle 12. The incremental increase in the annular space 19 is filled by the settling of the powdered refractory hard metal and by the molten filler metal. The elevated temperature is maintained until complete infiltration is achieved. The mold is then permitted to cool. Solidification of the filler metal provides a solid metallic intermediate structure which substantially fills the annular space 19, and which is coalesced to the internal surface 13 of the steel sleeve 11. The intermediate structure comprises a matrix composed of the solidified filler metal and the refractory particles which lends mechanical strength to the structure. Cooling of the mold and its contents from the solidus of the filler metal to room temperature causes the annular structure and metal sleeve 11 to contract about the ceramic nozzle 12 exerting a uniformly distributed compressional force thereon. As mentioned previously, the molten filler metal exhibits properties of poor wettability on the hard ceramic either because of the inherent incompatability of the materials used or because of the surface conditions of the ceramic. Consequently, the holding force is due principally to the compressional forces exerted by the intermediate metal structure and the steel sleeve 11. Microscopic physical embedment of the solidified filler metal in the outer surface 16 of nozzle 11 could also contribute to the surprisingly high bond strength afforded by the present invention.

Thus, the final nozzle assembly 10 is seen to include an outer ferroalloy support 11, an inner hard, nonmetallic ceramic nozzle 12, and an intermediate structure brazed to the sleeve 11 and mechanically bonded to the nozzle 12 by an interference fit. The mechanical bond effected by the present invention relies on the difference in coefficients of thermal expansion between the refractory ceramics and the metallic materials. The refractory ceramics have low coefficients of thermal expansion (range: 2.0 – 9.4 × 10$^{-6}$/°C) whereas the metallic materials have relatively high coefficients of thermal expansion (range: 10.0 – 19.0 × 10$^{-6}$/°C). During the cooling phase of the process, the contraction of the metallic materials imposes evenly distributed compressive forces on the cylindrical surface 16 of the nozzle 12. These compressive forces not only provide an extremely strong bond but hold the ceramic nozzles in a state of compression which significantly enhances the working strength of many of the ceramics, notably boron carbide.

Although a variety (see Table I) of the hard, refractory ceramics can be used in the nozzle assembly 10, the hard nonmetallic ceramics, particularly diamond-like carbides (boron carbide and silicon carbide) are preferred because of their extreme hardness and their excellent wear-resistant properties.

The following example illustrates the effectiveness of the present invention. High density, hot pressed boron carbide nozzles purchased from Norton Company of Worcester, Mass., were mounted in a steel support sleeve by the method of the present invention. Each of the nozzles was three-eighth inch in diameter, three-fourth inch in length and had an inner opening of three thirty-seconds inch. The steel sleeves, machined from AISI 3310 steel, had an inside diameter of one-half inch, outside diameter of three-fourth inch, and a length of 1% inch. Tungsten carbide particles between 200 and 400 mesh size and a high-temperature filler metal were used to form the intermediate structure.

Erosion tests conducted on these nozzles revealed that they were far superior in erosion-resistant properties than were nozzle assemblies containing tungsten carbide inserts. The erosion tests were conducted by passing bentonitic drilling fluid containing varying amounts of silica sand through the nozzles at high velocities. Table II compares the performance of sintered tungsten carbide nozzle assemblies, cast tungsten carbide assemblies, and boron carbide nozzle assemblies.

TABLE II

| Nozzle assembly | Mounting sleeve | Differential pressure across nozzle (psi) | Sand content (vol %) | Erosion time (hours) | Erosion: (Percent increase in flow area) |
|---|---|---|---|---|---|
| Sintered tungsten carbide | Steel (Type 3310) | 10,000 to 14,000 | 2.0 | 3.2 | 28 |
| Cast tungsten carbide | Steel (Type 3310) | 10,000 | 0.2 | 1.6 | 80 |
| Boron carbide | Steel (Type 3310) | 8,000 to 14,000 | 2.0 | 4.0 | 12 |

Test data presented in Table II indicates (1) boron carbide is more wear resistant than tungsten carbide in nozzle service, and (2) the bonding strength between the ceramic nozzle and metallic support is capable of withstanding high mechanical loads with no evidence of failure or leakage.

A section of one of the boron carbide nozzle assemblies was extracted to determine the nature of the bonding mechanism. A diamond saw was used to make two radial cuts about 120° apart in the nozzle assembly. The extracted pie-shaped portion thus was relieved of all compressional forces. The boron carbide fragment readily dislodged from the solidified filler metal indicating the absence of a chemical bond. The filler metal, on the other hand, remained firmly affixed to the steel sleeve.

In regards to the application of the hard, refractory ceramics in cutting tools, considerable amount of difficulty has been experienced in mounting the nonmetallic ceramic cutting blades to a metal holder. See "Utilization of Ceramics for Metal Cutting Tools", by W. B. Kennedy, Rodman Process Laboratory, Watertown Arsenal, Report No. RPL6, United States Department of Commerce, Office of Technical Service, PB111758. As pointed out in this report, it is extremely important that the cutting blade be firmly affixed to the holder to prevent vibrations which shorten the ceramic tool life. Cutting tools used in metal processing are subjected to relatively high operating temperatures (above 350°F). Therefore the mounting technique must be such to provide good bond strength at high temperatures.

Shown in FIG. 2 is a tool assembly 25 which can be adapted to metal cutting tools such as conventional lathes. As shown, the tool blade 26 composed of a hard, refractory ceramic has a cylindrical body 27 and a shaped tip 28. The tip 28 can be shaped to the desired configuration by conventional diamond grinding techniques. The blade 26 is mounted in a steel sleeve 29 which can be milled from a steel block to provide an internal cylindrical surface 30, a threaded portion 31, and a hex head 32. The assembly 25 thus can be threadedly connected to a lathe or other cutting tool. The tool assembly 25 can be fabricated in the same manner described above for ceramic nozzle assemblies. The important hard, refractory ceramics which exhibit properties of extreme hardness, high-temperature strength, and wear resistance include alumina ($Al_2O_3$), silicon carbide (SiC), and boron carbide ($B_4C$). However, other hard, refractory ceramics listed in Table I can also be used. The cutting tool 25 constructed according to the present invention can be used to process a wide range of materials.

These hard ceramics are available commercially in the form of high density, self-bonded ceramics prepared by conventional hot pressing techniques.

Although the method finds particularly advantageous application in the fabrication of improved nozzle and cutting tool assemblies, it will be understood by those skilled in the art that the disclosed and claimed mounting method can be used in a variety of other applications.

We claim:

1. A method for mounting a tool element composed of a hard nonmetallic ceramic material in a ferroalloy support which comprises the steps of: (a) positioning said tool element concentrically in an opening formed in said ferroalloy support, the diameter of said opening being larger than the diameter of said tool element; (b) placing a refractory hard metal powder in the annular space defined by said tool element and said support to form a packed interval therein which surrounds a portion of said tool element; (c) infiltrating a molten filler metal which wets said ferroalloy support and said refractory hard metal powder but does not wet said nonmetallic ceramic material into said packed interval at an infiltration temperature above the liquidus of said filler metal; and (d) thereafter permitting the assembly to cool to a temperature substantially below the solidus of said filler metal to securely mount said tool element in said support.

2. The method according to claim 1 wherein the opening formed in said ferroalloy support is shaped complementary to a portion of said tool element and wherein the step of positioning said tool element places said portion concentrically in said complementary shaped opening.

3. The method according to claim 1 wherein the hard nonmetallic ceramic material is a carbide of one of the Group III B and IV B elements of the periodic system.

4. The method according to claim 3 wherein the carbide is boron carbide.

5. The method according to claim 1 wherein the nonmetallic ceramic is sintered alumina.

6. A method for mounting a nozzle composed of a nonmetallic ceramic in a ferroalloy support which comprises: (a) positioning said nozzle concentrically in an opening formed in said support, the diameter of said opening being larger than the diameter of said nozzle and therewith defining an annular space; (b) packing said annular space with a refractory hard metal powder; (c) infiltrating into said refractory hard metal powder packed in said annular space a molten filler metal which wets said ferroalloy support and said refractory hard metal powder but does not wet said nozzle at an infiltration temperature above the liquidus of said filler metal; and (d) thereafter permitting the assembly to cool to a temperature substantially below the solidus of said filler metal to securely mount said tool element in said support.

* * * * *